(12) United States Patent
Fujishima

(10) Patent No.: US 8,982,104 B1
(45) Date of Patent: Mar. 17, 2015

(54) TOUCH TYPING EMULATOR FOR A FLAT SURFACE

(75) Inventor: Yuzo Fujishima, Chiba (JP)

(73) Assignee: Google Inc., Mountain View, CA (US)

( * ) Notice: Subject to any disclaimer, the term of this patent is extended or adjusted under 35 U.S.C. 154(b) by 12 days.

(21) Appl. No.: 13/571,709

(22) Filed: Aug. 10, 2012

(51) Int. Cl.
*G06F 3/043* (2006.01)

(52) U.S. Cl.
USPC ........... 345/177; 345/173; 345/174; 345/178; 178/18.04; 178/19.02

(58) Field of Classification Search
CPC ...... G06F 3/043; G06F 3/0433; G06F 3/0436
USPC .............. 345/156–158, 173–183, 166–168; 178/18.01–18.02, 19.02; 367/13, 180
See application file for complete search history.

(56) References Cited

U.S. PATENT DOCUMENTS

| | | | |
|---|---|---|---|
| 6,288,711 B1 * | 9/2001 | Tanaka et al. | 345/179 |
| 6,525,717 B1 | 2/2003 | Tang | |
| 6,611,253 B1 | 8/2003 | Cohen | |
| 2003/0132950 A1 | 7/2003 | Surucu et al. | |
| 2003/0217873 A1 * | 11/2003 | Paradiso et al. | 178/18.04 |
| 2006/0190836 A1 | 8/2006 | Ling Su et al. | |
| 2006/0192763 A1 * | 8/2006 | Ziemkowski | 345/168 |
| 2011/0175813 A1 * | 7/2011 | Sarwar et al. | 345/168 |

\* cited by examiner

*Primary Examiner* — Lun-Yi Lao
*Assistant Examiner* — Md Saiful A Siddiqui
(74) *Attorney, Agent, or Firm* — Gottlieb, Rackman & Reisman, PC

(57) ABSTRACT

A touch typing emulator to be placed on any flat surface is made from as few as two acoustic sensors connected by a wire that determines the separation between the sensors and is connected by a USB cable to a computer. The emulator receives two waves from each finger tap on the surface, a higher velocity wave and a lesser velocity wave. By affixing the sensors to a surface, the sensors, in connection with software in a computer receiving the USB connection, determines the location of the tapping of a users fingers on the surface and uses that information to emulate a typewriter keyboard.

10 Claims, 4 Drawing Sheets

TOUCH TYPING EMULATOR FOR A FLAT SURFACE

FIELD OF THE INVENTION

The present invention relates to the field of virtual input devices for a computer system, including surface acoustic detection.

BACKGROUND OF THE INVENTION

The most efficient apparatus for inputting alphanumeric information into a computer is a keyboard. Because many computer devices are miniaturized or in an attempt to lower the cost of manufacturing a small computer or because of some concept of elegance, many of these devices have an alternative to a full size keyboard. For example a virtual keyboard may be made to appear on a touch screen, which is simply too small for conventional typing. People have managed to adapt by learning to type with two thumbs or software controllers handle the inaccuracy of typing on miniature keyboards by guessing what the user intended to type. Also, component manufacturers have produced auxiliary full size keyboards that can plug into small computers, or even full size computers, through a USB or serial port or docking station.

There have been attempts to provide systems that detect the motion of a typists fingers as an alternative to having a series of contact switches that feed signals to the computer. Some have employed light scanners to form a real-time image of the position of the user's fingers and relied upon an acoustic signal to detect that the hand has tapped a surface. Others have used rows of acoustic sensors to replace rows of keys on a typewriter input and made the device more accurate by determining from analysis of the acoustic waveform which finger has struck a surface. Others provide a reduced set of keys and use a series of sound sensors together with optical sensors to identify which finger has struck the reduced keyboard.

While each of the prior art devices purports to be able to determine the location of a user's fingers striking a surface, each is a complex combination of multiple sensors which does not solve the problem of providing a simple setup for virtualizing keyboard input.

BRIEF DESCRIPTION OF THE INVENTION

The present invention provides a touch typing emulator to be placed on any flat surface. The emulator is made from as few as two acoustic sensors connected by a wire that determines the separation between the sensors and is connected by as USB cable or the like to a small computer. By affixing the sensors to a surface, the sensors, in connection with software in a computer receiving the USB connection, can determine the location of the tapping of a users fingers on the surface and use that to emulate a typewriter keyboard. To enable as few as two sensors, it is necessary to detect two different acoustic waves emanating from a single tap. This is accomplished by detecting either different acoustic waves, such as a surface wave and an airborne wave, two different modes of wave motion, such as longitudinal and transverse propagated waves, or different portions of a single wave separated by dispersion. In each case, the two waves propagate with different velocities.

Since the surface is capable of supporting at least two sound waves having different velocities, the distance to the point of finger contact and the time of finger contact can be calculated at each sensor independent of the distance to or the location of the other sensors. From the result of measurement of the two waves at two of the sensors, the location of the typed "key" may be determined, as well as the time when the key was struck.

The present invention is thus adapted to receive two waves from each finger tap on the surface, a higher velocity wave and a lesser velocity wave.

We refer to the first acoustic wave to arrive at a sensor as first sound and the second as second sound. Assuming that these signals arrive at a particular sensor n at times $T_1^{(n)}$ and $T_2^{(n)}$ respectively (n is an index, not an exponent) and the respective velocities of the first sound and second sound are $V_1$ and $V_2$, the distance from the finger strike to sensor n is $$D_n = V_1(T_1^{(n)} - T) = V_2(T_2^{(n)} - T) \text{ for } n=1,2$$

where T is time of the finger strike. Thus the time of the finger strike is $$T = \frac{V_1 T_1^{(n)} - V_2 T_2^{(n)}}{V_2 - V_1}$$

The coordinates of the finger strike (x,y) can then be determined from the solution of the following two quadratic equations $$\frac{\sqrt{(x-x_n)^2 + (y-y_n)^2}}{V_1} = T_1^{(n)} - T$$

for $n = 1, 2$

The surface waves are also subject to dispersion. In dispersion the peak region of a wave may travels at a velocity which is less than that of the wave front. Thus a first sound and a second sound can also result from the dispersion that occurs in the propagation of the surface waves.

DETAILED DESCRIPTION OF EMBODIMENTS

Figure 1:
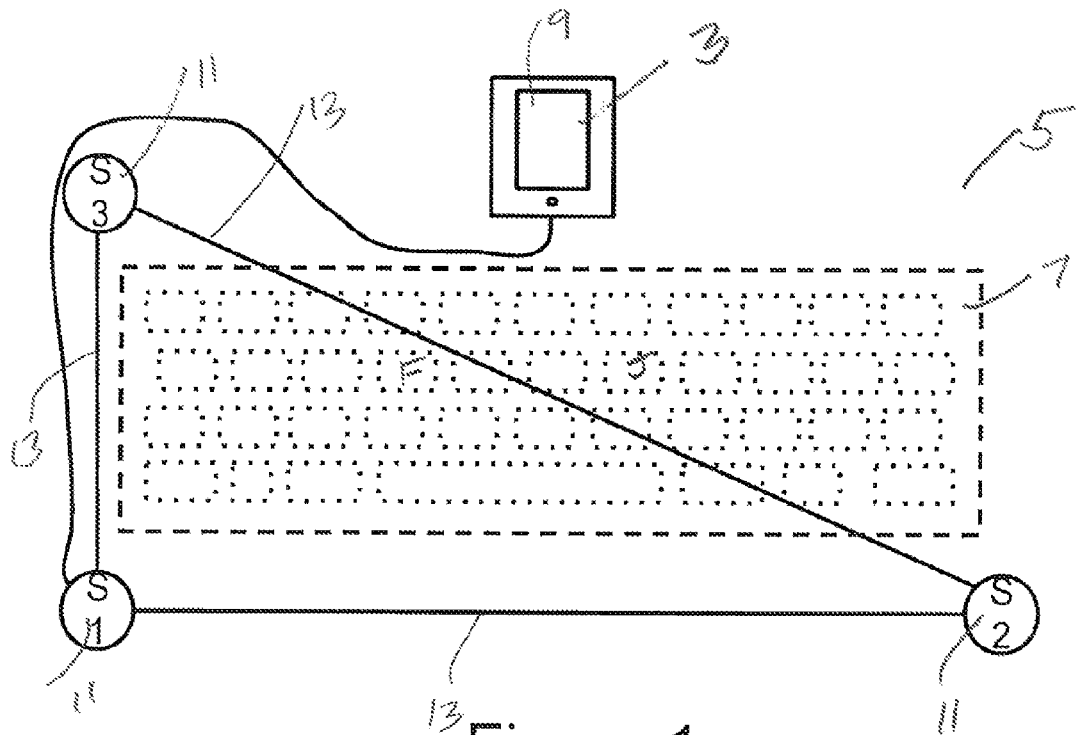
FIG. 1 depicts a touch typing emulator employing three sensors.

The object of this invention is to allow the operator of a portable computer such as a smart phone or tablet 3 effectively to type alphanumeric input by striking with his or her fingers any surface 5 as if a typewriter keyboard was present on that surface. By a portable computer is meant a device that includes a processor, and which accepts alphanumeric input but often lacks a normal typewriter size external keyboard as an input device. The invention in effect provides an imaginary keyboard 7 as depicted in FIGS. 1 and 2.

Examples of such surfaces 5 are wooden, metallic or glass tabletops without any special preparation or they could be specially prepared surfaces with advantageous acoustic properties. The surfaces 5 do not have to be rigid, and include surfaces such as stretched membranes. In general the surfaces 5 would be horizontal, but surfaces with other orientations, including vertical, are within the scope of the invention. One use of the invention is to free the operator of a smart phone, such as those employing an Android™ operating system, from having to type on relatively small touch screens 9 that typically contain touch sensitive layers.

Figure 2:
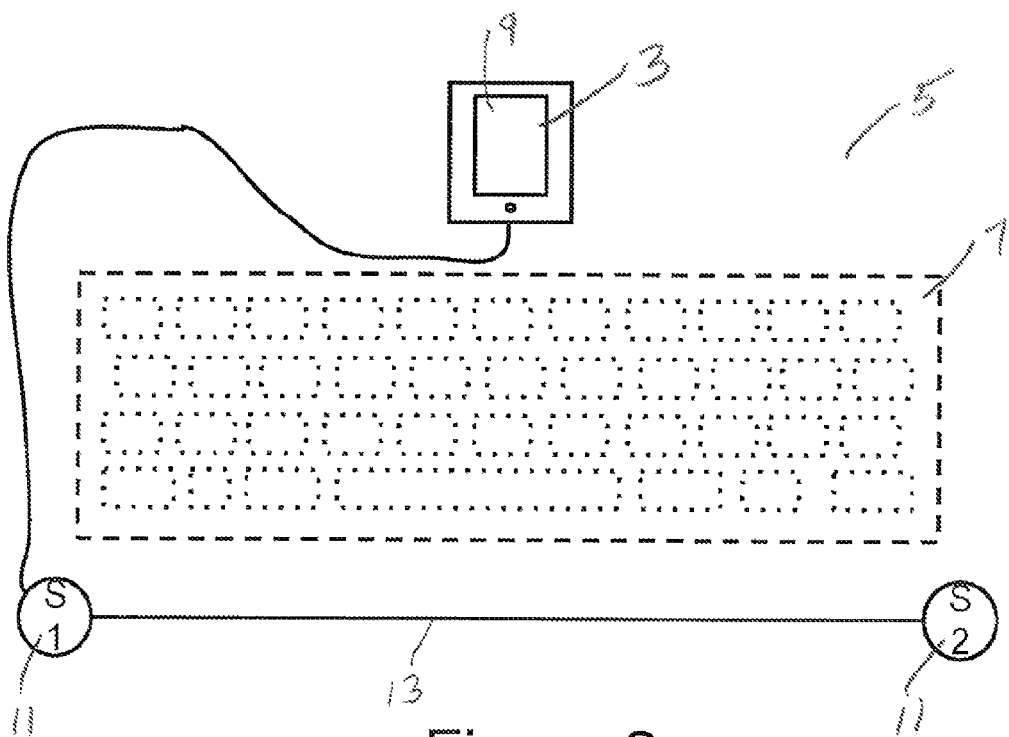
FIG. 2 depicts a touch typing emulator employing two sensors.

As shown in FIG. 1, in one embodiment the invention employs acoustic wave sensors 11 that can detect waves caused by "typing" on the surface. Here, typing refers to fingers sharply striking the surface. The sensors 11 are transducers that can output a signal in response to the arrival of an acoustic wave caused by the typing. For example, the transducer may contain a piezoelectric material that outputs an electrical pulse in response to the vibration of the surface caused by the arrival of the acoustic wave. Examples of transducers include devices capable of converting vibrations into electrical signals representing those vibrations. Polarized foils sensitive to changes in capacitance caused by motion of the foil may be used to transduce the vibrations. Metal strips vibrating in a magnetic field are another example of an effective transducer. Other forms will be known to persons skilled in this art. The sensors may have sufficient intelligence to indicate the time of arrival of the wavefront by transmitting a signal containing the time information to the portable computer. It may simply issue a signal indicative of the sensing of the wavefront. In addition the sensors may be more passive and not transmit to the computer but rather undergo a change in state so that when polled by the computer the fact that the wave front has arrived can be determined. Such a change in state may be the storage of data in a memory located on one or more of the sensors. The sensors may be interfaced to the computer using USB or other connectors providing both a data path to the portable computer and a source of power to the sensors. The sensors may be interconnected by wires so that only one needs to be connected directly to the computer.

Figure 3:
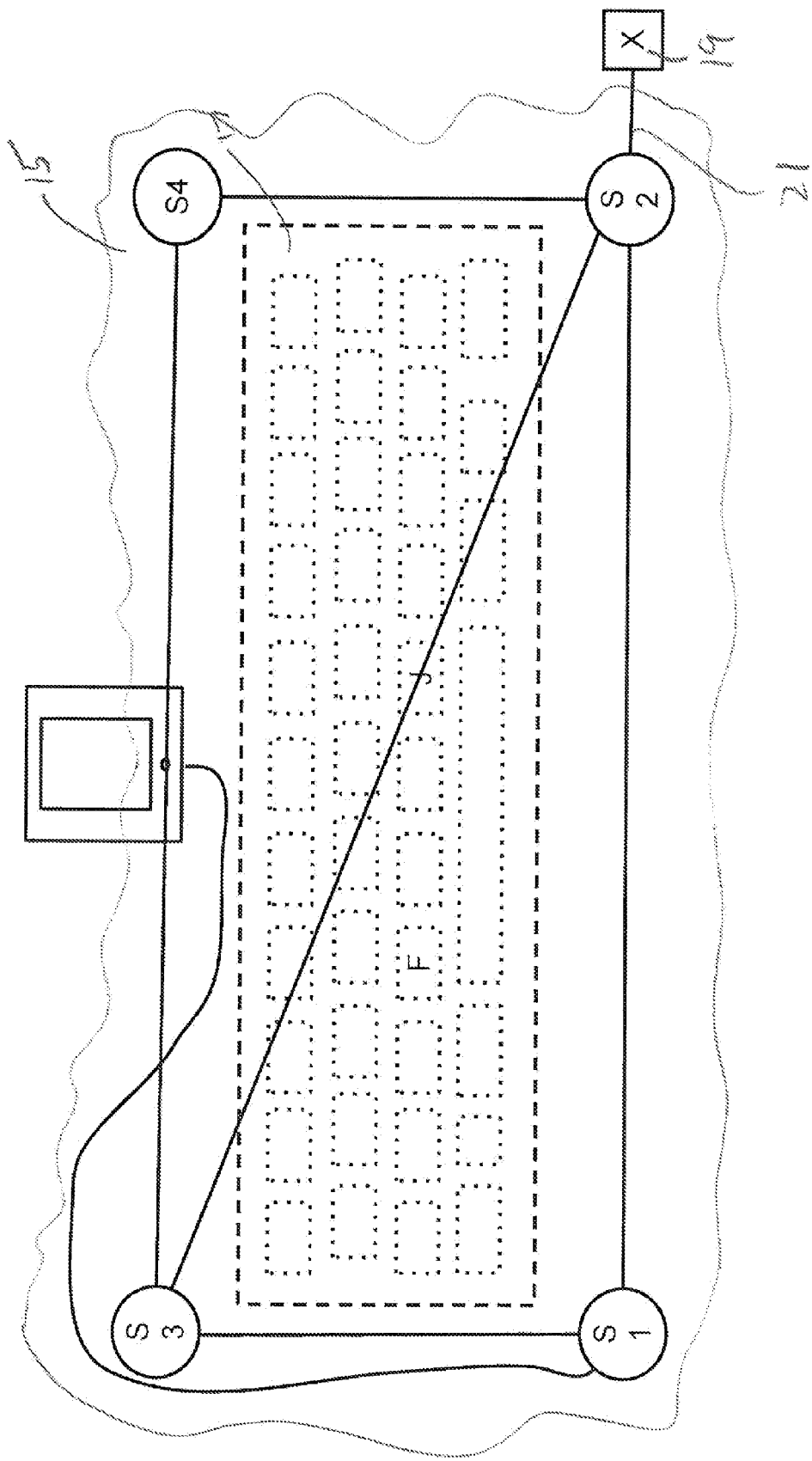
FIG. 3 depicts a touch typing emulator employing four sensors in which one pair of sensors are not directly connected to each other yet all distances between sensors are determined.

The distances between the sensors 11 may be predetermined by the connectors 13 that extend between pairs of sensors 11. The connectors do not have to be rigid. For example they may be wires, which when made taut determine the distance between each pair of the surface wave sensors 11. Also, when there are more than three sensors 11, it is not necessary to have connectors 13 between every two sensors, provided that there are sufficiently many so that the distances between every pair of sensors are determined by the lengths of such connectors as there are. FIG. 3 shows an example of four sensors 11, where all distances are determined without every pair of sensors having to be spanned by connectors. Alternatively the sensors could be provided with wireless communication with each other so that they can exchange signals enabling them to determine their relative distances by timing the transmission of signals between them. Conversely, the sensors could be attached to a membrane 15 that can be rolled up, but which has indicated on the membrane an image 17 of a typewriter keyboard. The membrane could act as the transmission surface when placed on a desktop while at the same time it assures that the distance between the sensors is determined.

Figure 4:
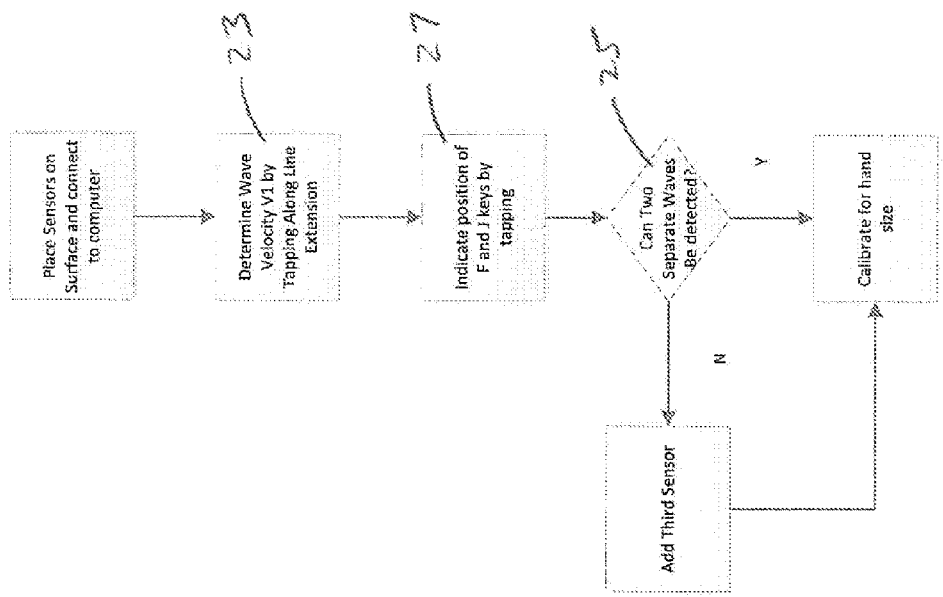
FIG. 4 is a flow chart of the steps for initializing the typing emulator.

Based on time of receipt of acoustic waves at the sensors 11 caused by typing on the surface, a determination can be made as to which alphanumeric or control key was intended to be simulated as struck. The algorithm for doing so requires knowledge of the velocity of the waves on the surface. That velocity can be measured by emitting a wave from any one of the sensors and receiving it another sensor, and knowing the time difference and distance between the sensors. For the purpose of determining the wave velocity, the sensor can either be capable of emitting a sound wave at a known time, or by relying upon the sound caused by placing a sensor on the surface when the configuration is set up. FIG. 4 is a flow chart for initializing the emulator. As indicated at 23 another way would be to touch the surface at a point 19 along the extension 21 of a line passing through any two of the sensors and noting the time of receipt of the sound at each of the two sensors along that line. If two separate waves cannot be detected at step 25, the system defaults to requiring three sensors.

Assuming as in FIG. 1 that there are 3 sensors, located at coordinate positions $(x_n, y_n)$ for n=1 to 3, and that the surface was struck at time T at the location (x, y), then assuming that the wave front travelled at velocity V in all directions, the wave front would arrive at sensor n at time $T_n$ determined by the equation $$T + \frac{\sqrt{(x-x_n)^2 + (y-y_n)^2}}{V} = T_n$$

for $n = 1, 2, 3$.

Since the quantities $x_n$, $y_n$, $T_n$ and V are either known or measured, this provides three quadratic equations for the unknowns x, y and T. Solving for the square of the radical in any two of the equations and subtracting them from each other gives a linear equation in x and y. Since there are two independent pairs of equations, this provides two equations linear in x and y, which may be solved for x and y as functions of T and substituted into any one of the equations to eliminate the variables x and y and provide a quadratic equation for T, which can be solved (rejecting the unphysical negative solution) and substituted back to provide values for x and y, thus giving a complete solution for x, y and T. Also there are known algorithms in open source software that could be employed to solve for (x,y).

The range of coordinates (x,y) corresponding to the imaginary keyboard keys are determined in the manner to be discussed below, and if x and y fall into one such range, the keystroke is determined. To reduce the effect of errors in the system, an additional sensor may be added. With 4 sensors there are four independent determinations of the key location (since each group of three is defined as missing one of the four sensors). These may be compared to check that the determinations are in agreement. If not, the finger stroke could be rejected or the majority determination (e.g. three out of four) of keystroke used.

FIG. 4 is a flow chart for the steps in initializing the emulator. As indicated at 27, the coordinates for the virtual keys may be determined by having the user indicate on the surface where two keys are located, for example the F and J keys, and then typing a sufficient sequence of letters to indicate hand size and position. Typing the entire alphabet is desirable but not necessary. A few keys on a few rows should suffice.

Calibration is necessary because of the different surface characteristics and the different size of a user's hands, which would alter the comfortable typing position for a child as compared to an adult. Calibration consists of modifying the dimensions of the separation of the typewriter keys to accommodate the size of the user's hands. Once the calibration procedure is completed by a user, an image of a keyboard appears on a user screen to be processed by simulation software. Each contact by a finger with a virtual key is displayed on the user screen.

The transducers recognize the taps of the fingers as instances of typing. If the user is going to pick and peck it will be necessary to further identify the surface, for example by placing a paper representation of a keyboard on the surface or by further marking the surface.

In any event it is useful for the user to be able to see a virtualization of the keyboard on the screen 9 associated with the portable computer 3 and an indication of which keystroke has been typed. This allows correction of hand placement to be made.

Two Sensor Embodiment

In a further embodiment, a system employing only two sensors is implemented as shown in FIG. 2. This further embodiment takes advantage of the fact that acoustic waves that are detected may be of several different modes. In solids, sound waves propagate as two different types. A longitudinal wave is associated with compression and decompression in the direction of travel, which is the same process as all sound waves in gases and liquids. A transverse wave, often called a shear wave, is due to elastic deformation of the medium perpendicular to the direction of wave travel.

In general, compression waves and shear waves may have different speeds at the same frequency. Therefore, they arrive at an observer at different times. The speed of an elastic wave in any medium is determined by the medium's compressibility and density. The speed of shear waves is determined by the solid material's stiffness, compressibility and density. Typically, for a metallic surface, compression waves travel faster in materials than do shear waves. For example, a typical steel alloy would provide a longitudinal velocity of 6000 m/s for a compression wave, while the velocity of the shear wave would be on the order of 3200 m/s for the same material. Over a distance of 10 cm, the two waves would arrive separated by approximately 0.02 msec, which is within a measurable range.

Acoustic waves (mainly longitudinal oscillations) propagate along or through the surface caused by finger tapping on the surface. These will be referred to as surface waves although they may propagate below the superficial surface. These are distinguished from the acoustic waves propagating through the air, which will be referred to as airborne waves. The airborne waves, in addition to reaching the acoustic wave sensors, are the same waves that reach the user's ears and are heard as distinct taps. In general, the surface waves, because of the greater than air density of the surface, travel at velocities much greater than the velocity of the airborne waves. Depending upon the mechanical properties of the surface such as hardness or elasticity, the surface waves may include, in addition to longitudinal waves, detectable transverse sound waves propagated along the surface or Rayleigh waves. Each of these different modes of wave motion has an associated velocity of propagation. Thus there may be more than one detectable wavefront arriving at each sensor from a single finger strike against the surface, and these different wavefronts travel at different constant velocities. For a homogenous material the velocities will be independent of direction from the finger strike to the sensor. Although each of the different modes may be detectable by the transducers already mentioned, it may be advantageous to include in each sensor a microphone or other pickup for the airborne waves.

Since the surface is capable of sending at least two sound waves having different velocities, the distance to the point of contact and the time of contact can be calculated at each sensor independent of the distance to or the location of the other sensors. From the result of the time of receipt measurement at two of the sensors, the location of the typed "key" may be determined, as well as the time when the key was struck. The determination of the striking time should be the same for each of the sensors, and that may be used as a check to assure that the received signals have originated from the same impact and are not spurious signals or echoes. Using multiple sensors allows better resolution of the location of the point of contact. For each pair of sensors, or three sensors in the case that does not rely upon dispersion, a circle of confusion is defined. The intersecting of the circles of confusion is determined to be the locus of the point of contact. If there is no proper intersection the contact is not interpreted and the typist must repeat the stroke, preferably with a stronger strike.

The present invention is thus adapted to receive two waves from each finger tap on the surface, a higher velocity wave and a lesser velocity wave. Initially the waves are created at the same time at the same distance from the transducer. As the waves propagate towards a sensor, they necessarily separate due to their different velocities and arrive at the sensor at different times. The further apart these times are, the greater the distance from the sensor to their point of origin. This time difference is thus a measure of that distance. The detection of one such wave pair is thus a measure of the distance from the transducer to the point of origin, and thus allows the construction of a circle on which the point of origin lies. When there are two sensors, two circles centered at the sensors may be constructed and the point struck by the user's finger lies on both, i.e. on the intersection of the two circles, which is necessarily two points, only one of which is on one side of the line extending from one sensor to the other, and one of which is on the other side of that line. Assuming that it is known on which side of that line the finger strike must have occurred, the position of the finger strike is determined.

Figure 5:
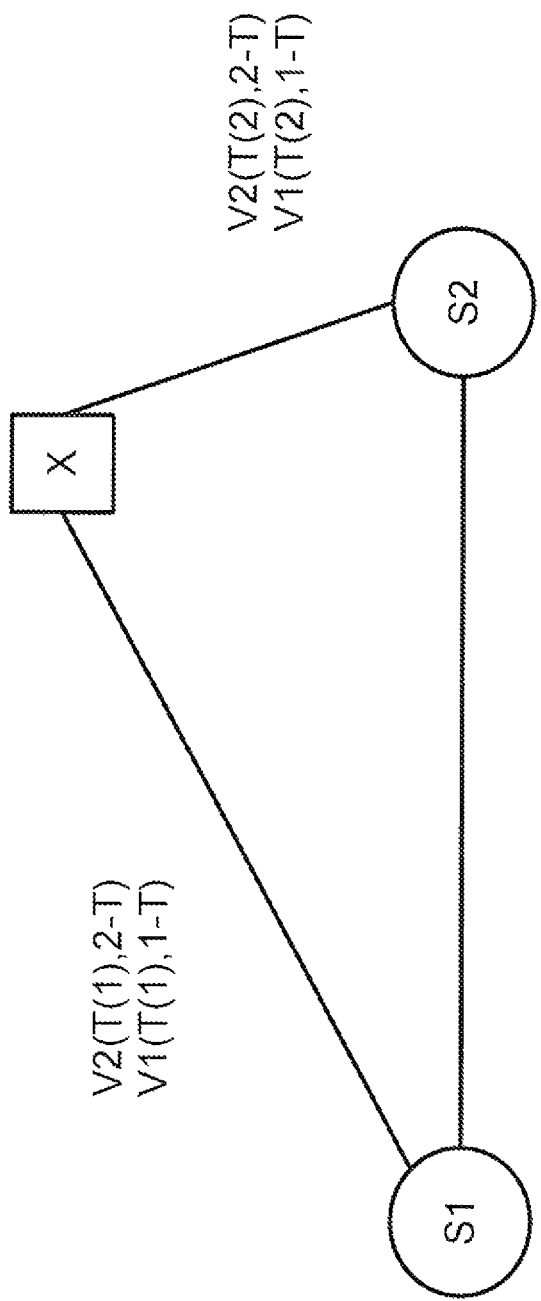
FIG. 5 depicts the arrival at first and second sound at each of the two sensors and indicates the distance as functions of velocity and time.

We refer to the first acoustic wave to arrive at a sensor as first sound and the second as second sound. Assuming as depicted in FIG. 5 that these signals arrive at a particular sensor n at times $T_1^{(n)}$ and $T_2^{(n)}$ respectively (n is an index, not an exponent) and the respective velocities of the first sound and second sound are $V_1$ and $V_2$, the distance from the finger strike to sensor n is $$D_n = V_1(T_1^{(n)} - T) = V_2(T_2^{(n)} - T) \text{ for } n=1,2$$

where T is time of the finger strike. Thus the time of the finger strike is $$T = \frac{V_1 T_1^{(n)} - V_2 T_2^{(n)}}{V_2 - V_1}$$

Note that since there are two equations, each of which determines T, the time of the finger strike, this can be used to check the consistency of the method, or to make it unnecessary to determine both the velocity of the first sound and the second sound since knowing either would allow calculation of the other from the measure of the arrival times.

The coordinates of the finger strike (x,y) can then be determined from the solution of the following two quadratic equations using the method previously discussed $$\frac{\sqrt{(x-x_n)^2 + (y-y_n)^2}}{V_1} = T_1^{(n)} - T$$

for $n = 1, 2$

Each surface sound wave has a characteristic shape if plotted as a function of displacement verses time, or plotted as a Fourier representation of the frequency distribution in the sound. The latter is a more convenient where it is desired to indicate the dispersion of the sound wave. The former is more convenient to understand the detection of the sound wave as a function of its magnitude of displacement that is most likely to affect a transducer that is subject to the displacements caused by the surface wave. Either of these representations may be referred to as the acoustic signature of the wave. The acoustic signature may be used to identify which finger of the user's hand struck the surface and the strength with which it was struck.

The surface waves are also subject to dispersion, which implies that the different Fourier components of the initial signal propagate at different velocities. For example, the received surface waves have a waveform dependant on the properties of the surface. The wave form provides a front edge, which is the portion of the waveform that is first detectable at a transducer and which includes the Fourier components with relatively high velocity compared with the peak of the wave form. The waveform provides a peak region, which is the region of maximum oscillation of the surface caused by the travelling wave. The peak region travels at a velocity which is less than that of the wave front. Thus a first sound and a second sound can result from the dispersion that occurs in the propagation of the surface waves.

Where more than two transducers are provided, the presence of the third transducer may operate as a check on the first two, and used to reduce the circle of confusion as to the location of the origin of the surface contact. Furthermore, when there are three or more transducers present, the location of the point of origin of the surface waves may be confirmed by the triangulation of three contact measurements or that measurement may be used to reduce the circle of confusion of the location of the contact point.

Initially, if the dispersion of the waves is relied upon, the system measures a noise level at each sensor. The arrival of a signal with a multiple of that noise level is identified as the leading edge of the first received pulse. An appropriate S/N ratio is 5, although that may be readjusted dependent upon the perceived accuracy of the system. When the first signal arrives a time window is opened. Only signals arriving within that time window are utilized to determine the location of the finger tapping.

One feature of the invention is that the strength of the contact translates into the magnitude of the wave pulse. This may be used to indicate capitalization. This is an advantage because the location of shift keys varies from keyboard to keyboard.

To resolve the meaning of each keystroke, a visual representation of a keyboard may be displayed on a computer screen, where the simulation of a finger or hand, or other marker, is seen as if striking the appropriate key. This will help the user reorient in the case that the wrong key has been struck. The text may be exhibited. Erasure can be accomplished by tapping above the area of the keyboard.

The invention has been described for particular embodiments, however it may be produced in different configurations from different materials, or its steps may proceed in a different order. In particular the embodiment depicted in the drawings is merely one example of the principal of the invention and is not intended to limit the invention. The person of average skill in the relevant art will be able to arrive at other variations without departing from the scope of the invention, which is defined by the claims stated in the patent issued from this application.

What is claimed is:

1. A touch typing emulator for use on a surface comprising two wave sensors (n=1, 2) adapted to be placed upon the surface, wherein said sensors are each capable of transmitting signals or changing states in response to the arrival at different times at said sensor of first and second acoustic waves of different known velocities travelling to said sensor in different media and caused by typing on the surface, a processor adapted to determine from said sensors the times of arrival $T_1^{(n)}$ and $T_2^{(n)}$ at sensor n of the two acoustic waves, and programmed to determine, from those times of arrival the time of touch typing $$T = \frac{V_1 T_1^{(n)} - V_2 T_2^{(n)}}{V_2 - V_1}$$

where $V_1$ and $V_2$ are the known velocities of the first and second acoustic waves and the subscripted and superscripted T factors are the times of arrival of the first and second waves at the nth sensor and to determine a typing key intended to be struck.

2. The touch typing emulator of claim 1, wherein the sensors are attached to a flexible membrane to be placed on the surface.

3. The touch typing emulator of claim 2, wherein the flexible membranes has drawn upon it a pattern of a typewriter keyboard.

4. The touch typing emulator of claim 3, where the sensors are adapted to determine their distances from each other by exchanging and timing signals.

5. The touch typing emulator of claim 1, wherein the emulator is adapted to determine the velocities of the waves from signals received during placement of the sensors on the surface.

6. The touch typing emulator of claim 1, wherein the emulator is adapted to determine at least one velocity of waves on the surface during setup by touching the surface at a point along a line segment joining two sensors and not between the two sensors.

7. The touch typing emulator of claim 1, wherein each sensor is adapted to detect a surface acoustic wave and an airborne acoustic wave.

8. A method for touch typing upon a surface comprising the steps of placing two wave sensors (n=1, 2) upon the surface, said sensors each transmitting signals or changing states in response to the arrival at different times at said sensors of first and second acoustic waves of different known velocities travelling through different media caused by touch typing on the surface, determining from said sensors the times of arrival $T_1^{(n)}$ and $T_2^{(n)}$ at sensor n of the two acoustic waves, and determining, from those times of arrival the time of touch typing $$T = \frac{V_1 T_1^{(n)} - V_2 T_2^{(n)}}{V_2 - V_1}$$

where $V_1$ and $V_2$ are the known velocities of the first and second acoustic waves and the subscripted and superscripted T factors are the times of arrival of the first and second waves at the nth sensor and to determine a typing key intended to be struck.

9. The method for touch typing upon a surface claim 8, further comprising determining the (x,y) coordinates of the point at which the surface was struck form the solution of $$\frac{\sqrt{(x-x_n)^2 + (y-y_n)^2}}{V_1} = T_1^{(n)} - T$$

for $n = 1, 2$ where $(x_n, y_n)$ are the coordinates for the location of the nth sensor.

10. The method of touch typing upon a flat surface of claim 8, wherein one of said acoustic waves is a surface wave and the other of said acoustic waves is an airborne waves.

* * * * *